March 16, 1937.    R. W. ROSS ET AL    2,074,118
RECORDER
Filed March 8, 1934    5 Sheets-Sheet 1

INVENTORS
Raymond W. Ross and
Sigurd H. Seberhagen
BY Cornelius L. Ebret
their ATTORNEY March 16, 1937.  R. W. ROSS ET AL  2,074,118
RECORDER
Filed March 8, 1934   5 Sheets-Sheet 2
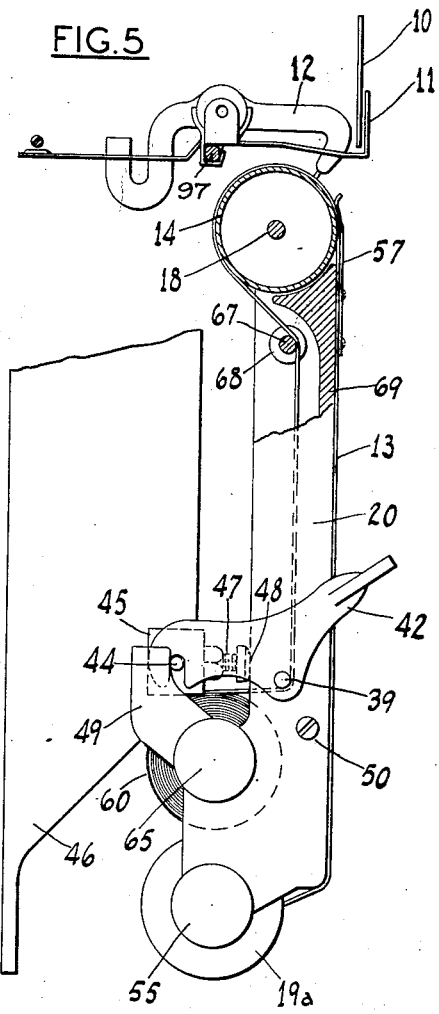
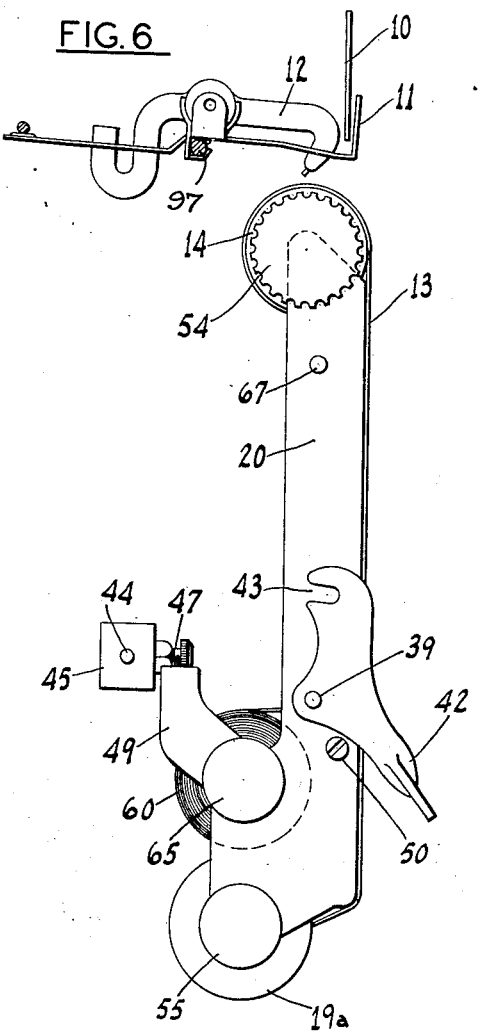
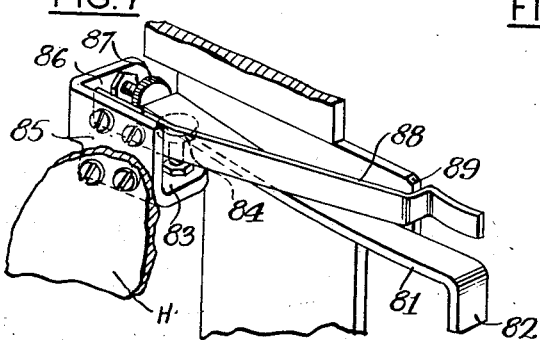
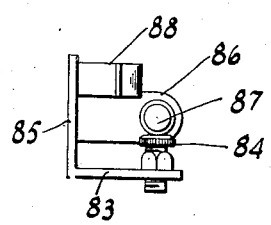
INVENTORS
Raymond H. Ross
BY and Sigurd H. Seberhagen
Cornelius D. Ehret
their ATTORNEY March 16, 1937.  R. W. ROSS ET AL  2,074,118
RECORDER
Filed March 8, 1934  5 Sheets-Sheet 3

Inventors
Raymond W. Ross and
Sigurd H. Seberhagen
By
Cornelius L. Ehret Attorney.

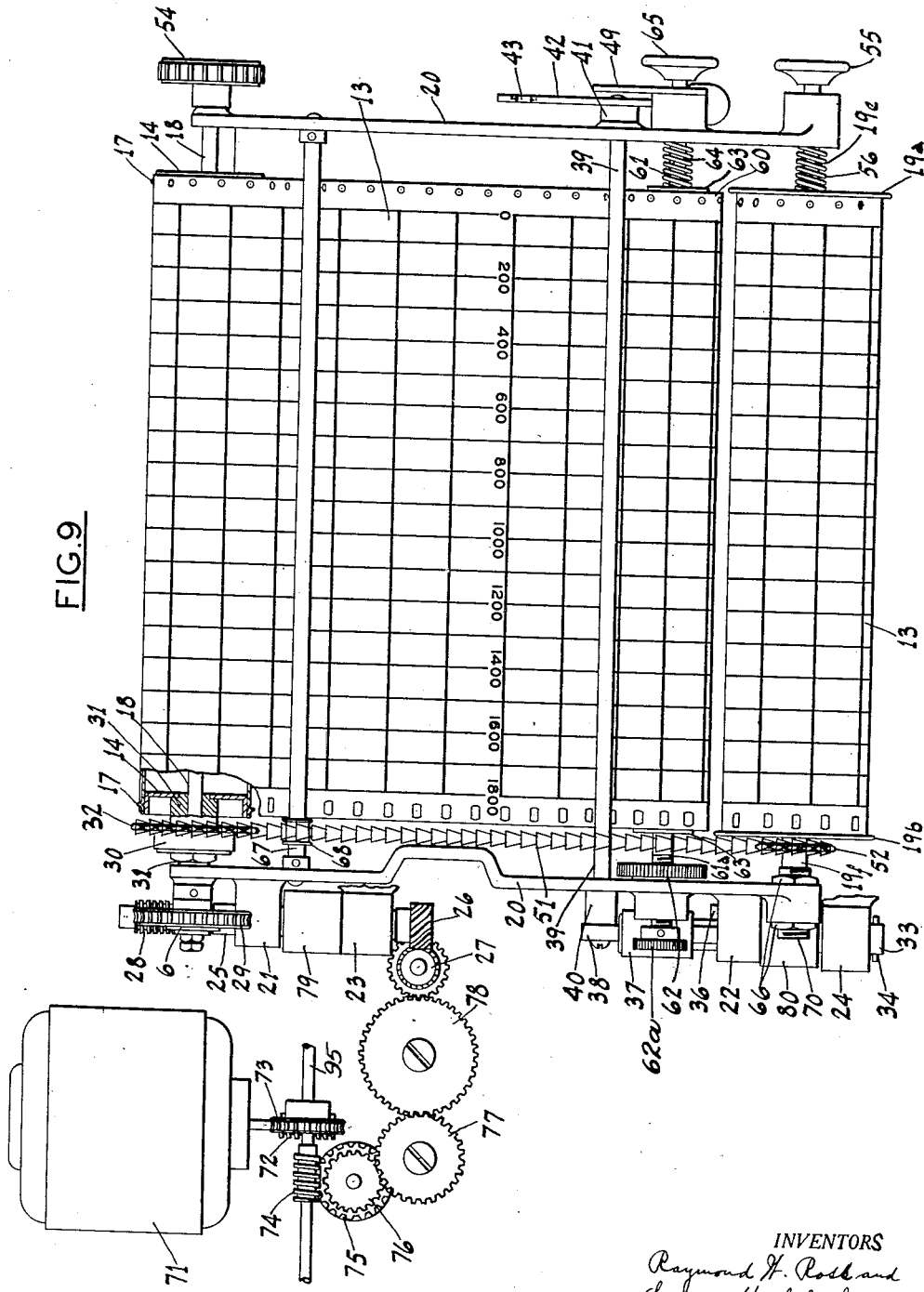

March 16, 1937.　　R. W. ROSS ET AL　　2,074,118
RECORDER
Filed March 8, 1934　　5 Sheets-Sheet 5
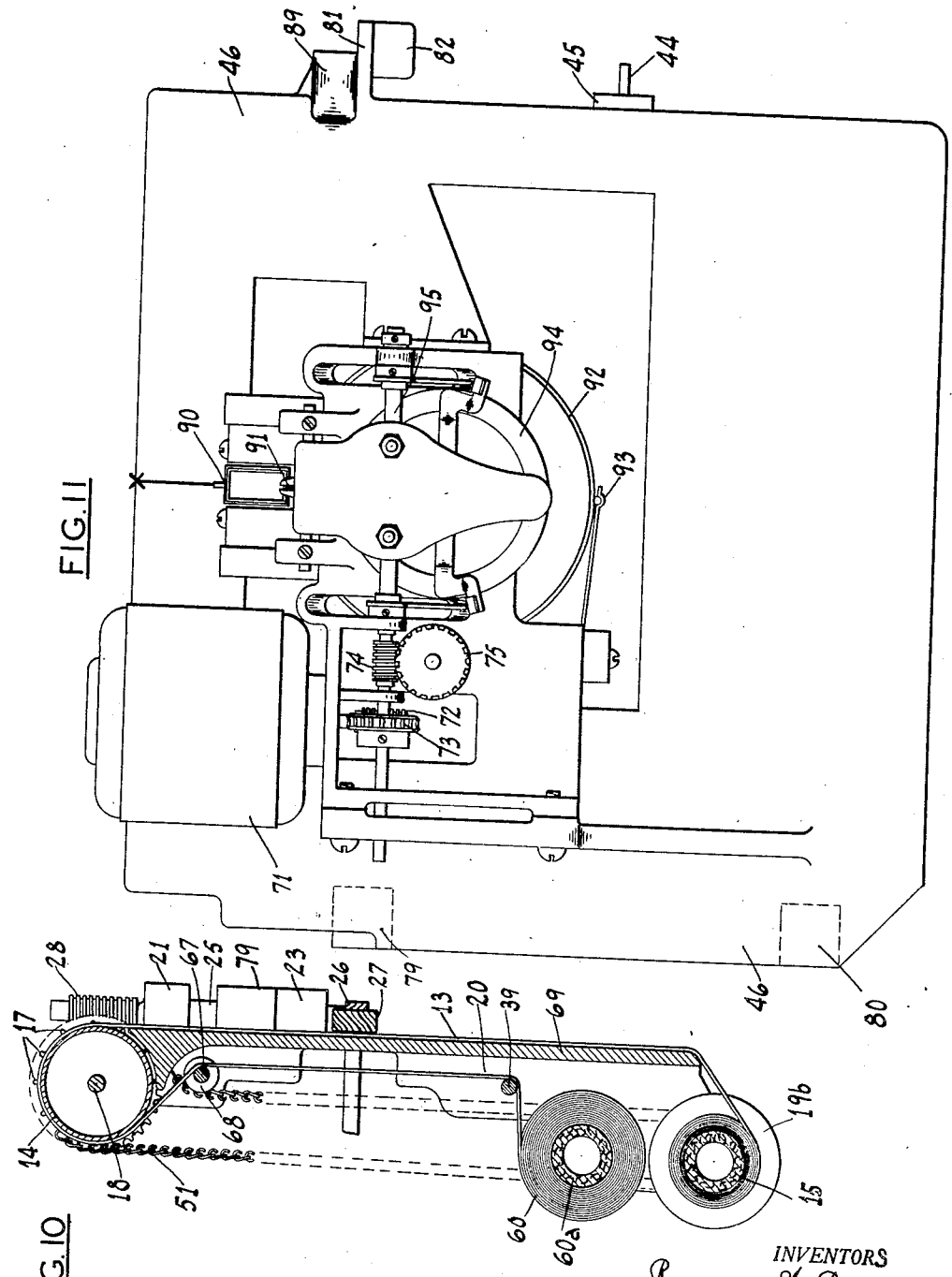

Patented Mar. 16, 1937

2,074,118

UNITED STATES PATENT OFFICE 2,074,118

RECORDER

Raymond W. Ross and Sigurd H. Seberhagen, Philadelphia, Pa., assignors to Leeds & Northrup Company, Philadelphia, Pa., a corporation of Pennsylvania Application March 8, 1934, Serial No. 714,546

21 Claims. (Cl. 234—70)

Our invention relates to new and improved recorders, and more particularly to a new and improved record chart assembly for such recorders, and to a new and improved mounting of the record chart assembly.

More specifically, our invention relates to recorder apparatus in which inspection, repair, or replacement of the parts of the recorder mechanism and the record chart assembly, and renewal of the record chart and its proper adjustment, may be effected with greater facility.

In accordance with our invention, the whole recorder mechanism and associated chart mechanism or assembly may be swung outwardly of the supporting casing or housing as a unitary structure to facilitate inspection, repair or replacement of parts. When thus swung outwardly and substantially free of the casing, this unitary structure may be lifted bodily from its supports, as for replacement by a similar unit having a different range of response. In addition, the record chart assembly may be independently swung free of the recorder mechanism to aid in renewing the record chart or making necessary adjustments. In other words, the recorder mechanism and the chart assembly are independently movable relative to each other and if, as is usually the case, the recording pen or stylus is attached to the recorder mechanism, there is provision made whereby the record chart assembly may be swung free and away from the recorder mechanism without interference with the recording pen.

Further, our invention comprises means for insuring an accurate registration of the relatively movable mechanisms when brought into normal cooperative relation or engagement.

Our invention comprises a new and improved recorder embodying one or more of the above features.

Referring now to the drawings, Fig. 1 is a view in front elevation of our improved recorder showing particularly the mounting of the record chart assembly.

Figs. 5 and 6 are side elevations, partly in section, of our improved record chart assembly shown, respectively, in normal engagement with the recorder mechanism and out of engagement therewith;

Fig. 7 is a perspective view of a stop device together with a fractional showing of parts of the housing and one of the frames supported thereby.

Fig. 8 is a detailed front elevation of the stop device of Fig. 7 to aid in accurately registering the recorder mechanism and its enclosing and supporting casing;

Fig. 9 is a view in rear elevation of the record chart assembly swung outwardly and free from the recorder mechanism;

Fig. 10 is a cross-sectional view of the record chart assembly, while Fig. 11 is a view in rear elevation of one form of recorder mechanism suitable for use in connection with our invention.

Figure 1:
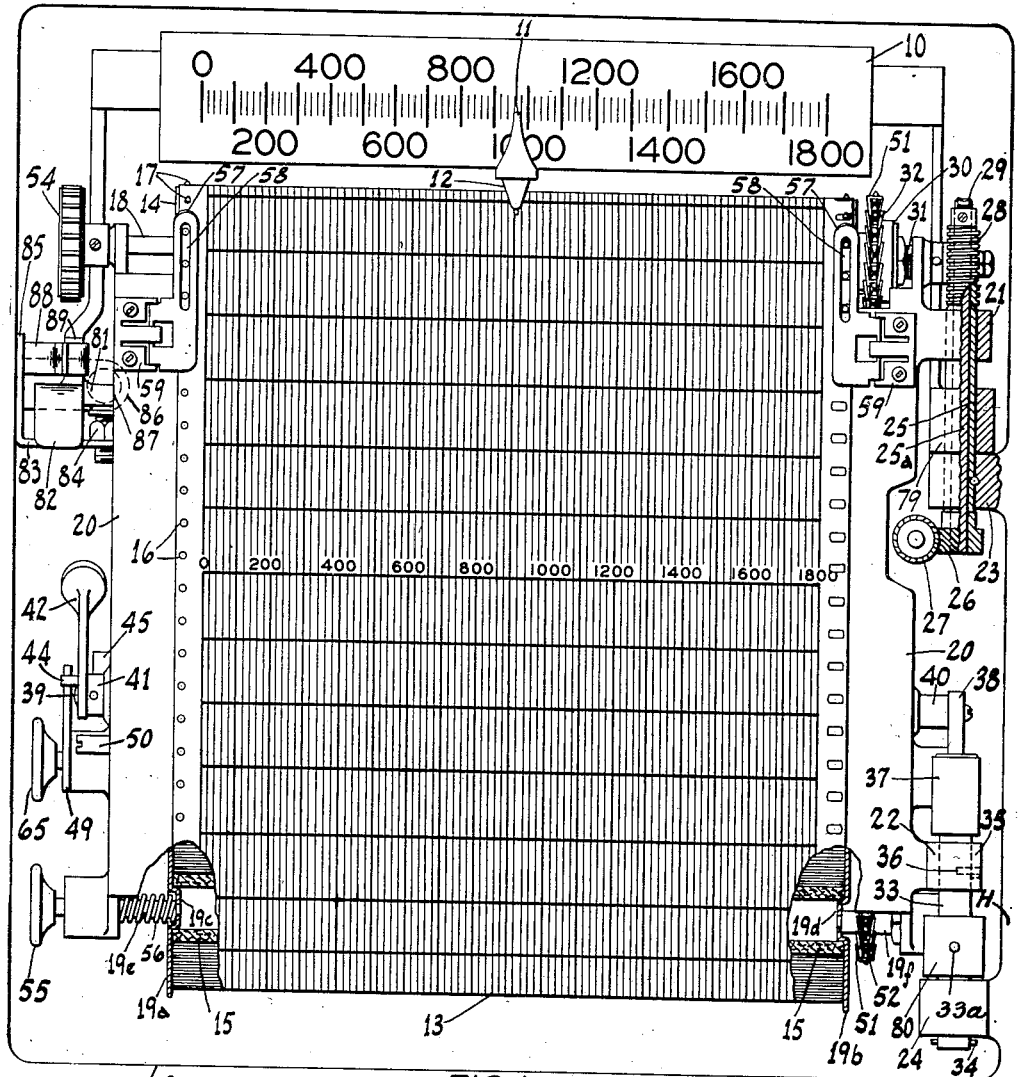

Referring now more particularly to Fig. 1, there is shown a recorder and a record chart assembly comprising an indicating scale 10 with which cooperates a suitable indicating pointer or needle 11 operated by the actuating mechanism, not shown in this view. The pointer 11 embraces as part of a unitary structure a recording pen, stylus, marker, or print wheel, a recording pen 12 being shown. It will be understood that any suitable recording device may be employed for in any way marking, printing, punching or otherwise effecting on the chart, markable element, or record sheet a record in the form of a continuous line or of a series of markings spaced from each other, and that either the term "marker" or the term "recorder pen", as used hereinafter in the specification and claims, is meant to include all such equivalent recording devices. The pen 12 cooperates with a record chart 13 of the continuous strip type. The chart 13 is supported from and driven by a suitable chart drum or reel 14 and is provided with perforations 16 for registering with driving pins or lugs 17 carried on the ends of the drum 14 which is supported on shaft 18, journalled in a chart frame 20.

The record chart 13 is rewound on a tubular mandrel or form 15 which may be, for example, a cardboard or fibre form of the type on which rolls of chart paper are wound and supplied to the trade. The mandrel 15 is supported on projections 19c and 19d extending from plates or disks 19a and 19b, respectively. The plates 19a and 19b are rigidly secured to and supported from stub shafts 19e and 19f journalled in the chart frame 20.

The chart frame 20 is provided with projecting lugs or arms 21 and 22 which form corresponding elements of a pair of hinges, the stationary elements 23 and 24 of which are supported from any suitable enclosing casing or housing H.

The upper hinge member comprising the elements 21 and 23 includes also a hollow sleeve 25 which acts as a hinge pin. Within the sleeve 25 is journalled a shaft 25a which forms one element of a driving connection between the motor of the recorder mechanism, described hereinafter, and the chart drum 14. As shown, a skew gear 26 is secured to the lower portion of the shaft 25a, cooperating with an additional skew gear 27 which is driven from the recorder mechanism, as described hereinafter. Rigidly secured to the upper end of the shaft 25a is a worm 28 cooperating with a worm-wheel 29 journalled on the shaft 18. The worm-wheel 29 is secured to the shaft 18 of the chart drum 14 by a spring washer 6 (Fig. 9), serving as a friction clutch, or by any other suitable lost-motion device. There is provided also, for purposes later described, a friction clutch 30, one element 31 of which is secured directly to the shaft 18, while the other element is connected to a sprocket wheel 32 journalled on shaft 18 of the chart drum 14.

Figure 2:
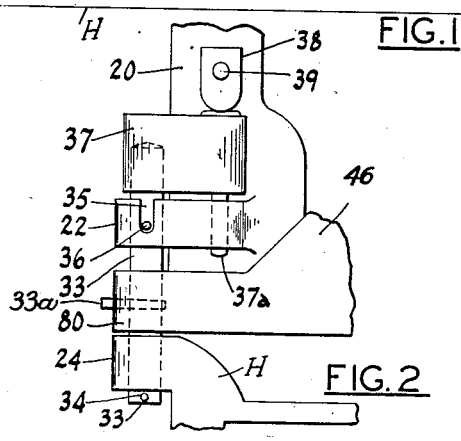
Fig. 2 is a fragmentary detail of a supporting hinge of the chart assembly shown in Fig. 1.

The lower supporting hinge of the chart assembly comprising the elements 22 and 24 includes a hinge pin 33 through the lower end of which extends a cotter pin 34. The hinge element 22 forming a part of the chart frame 20 includes a keyway or slot 35, shown more clearly in Fig. 2, while the hinge pin 33 carries a cooperating pin 36 engaging the slot in certain positions of the chart frame, as described more fully hereinafter. Pin 33, as appears in Figs. 1 and 2, is secured to the hinge projection 80 of the assembly frame 46 by the pin 33a.

There is provided also a latching mechanism for securing accurate registration between the relatively movable chart frame 20 and the frame of the recorder apparatus. This mechanism includes a supporting member 37 carried by and resting upon the upper end of the pin 33. The member 37 is movable with the chart frame 20 and is keyed thereto by a pin 37a engaging a bore in the hinge element 22. Cooperating with the supporting member 37 is a cam 38 rigidly attached to shaft 39 which is journalled in the chart frame at 40 and 41. Attached to the other end of the shaft 39, as shown more clearly in Figs. 5 and 6, is a lever or latch 42. The latch 42 includes at one end a detent or slot 43 which engages a pin 44 supported from a projection 45 rigidly secured to the frame 46 (Fig. 5) of the recorder mechanism. The projection 45 carries also an adjustable stop 47 effective accurately to limit the movement of the chart frame 20 toward the recorder frame 46 by engaging the chart frame 20 at 48. The chart frame 20 carries also a projecting or interlocking arm 49 cooperating with the pin 44 to aid in securing proper registration between the chart frame 20 and the recorder mechanism frame 46, and to prevent relative movement therebetween when in certain relative positions. If desired, a suitable stop 50 may be attached to the chart frame to limit the movement of the latch 42.

The manner in which the latching mechanism, together with the lower hinge mechanism, is effective to secure accurate registration between the frames 20 and 46 will be clearly understood by reference to Fig. 5 in which the two frames are shown in normal registration, and to Fig. 6 in which the frames are shown separated. In the normal position of the apparatus, as shown in Fig. 5, the chart frame 20 is supported by the cam 38 resting upon the member 37. This cam is effective accurately to position the frames relative to each other in their normal axial relation. The relative angular position between the frames 20 and 46 is accurately determined by the adjustable stop 47. Thus, accurate registration between the frames 20 and 46 is ensured and the record chart 13 is properly positioned with respect to the recording pen 12. The frames are retained in this position by means of the latch 42 which engages the pin 44.

When it is desired to effect the disengagement of the pen 12 and the chart 13, or to swing the chart assembly free or away from the recorder mechanism, the latch 42 is moved clockwise to the position shown in Fig. 6. This moves the cam 38 in a counter-clockwise direction, as referred to Fig. 2, thus lowering the chart frame 20, which has a limited motion along its pivotal axis. As the chart frame is lowered by the cam 38, the slot 35 of the hinge element 22 disengages the stationary pin 36. Simultaneously, or approximately so, the detent 43 of the latch 42 disengages the pin 44 and, as the chart frame is lowered, the projecting or interlocking arm 49 also moves below and thereby disengages the pin 44 so that the chart frame 20 is now completely free to swing about its pivotal axis to the right, as shown in Figs. 5 and 6, and away from the recorder mechanism. The assembly, as thus swung free of the recorder mechanism and casing and through 180°, as referred to Fig. 1, is shown in Figs. 9 and 12.

By lowering the chart frame before swinging it about its pivotal axis, any interference between the record chart and the recording pen 12 is eliminated or, in other words, the record chart freely clears the record pen in moving about its pivotal axis.

Figure 12:
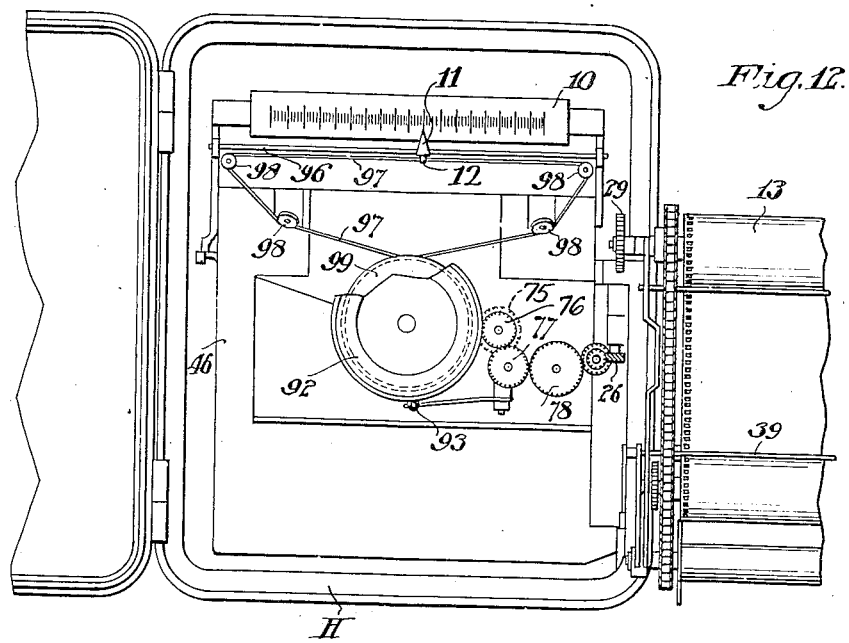
Fig. 12 is a front elevational view of the recorder with the cover open and the chart assembly swung out.

When the chart frame is swung to the positions shown in Figs. 6, 9, or 12, the pin 36 engages the upper surface of the hinge element 22 and prevents a raising of the chart frame 20. This is what might be termed a rough aligning or registering mechanism, and prevents the upward movement of the chart frame until in approximate normal registration with the recorder mechanism frame 46. An accurate aligning mechanism, which prevents improper movement and possible resulting injury to the apparatus, is provided in the above-described latching mechanism. As the chart frame 20 is swung through the position of Fig. 6 and into approximate registration with the recorder mechanism frame 46, at which time the pin 36 and slot 35 permit a raising of the chart frame 20, the upper surface of the projecting arm 49 engages the pin 44 attached to the frame 46 and prevents a raising of the chart frame until the arm 49 has moved to clear the pin 44, as shown in Fig. 5. The latch 42 may then be operated to raise the frame 20 by means of the cam 38 and to engage the pin 44 at the detent 43. In this manner an accurate registration between the frames 20 and 46 is insured and, at the same time, relative movement therebetween is precluded except when in such relative position about their pivotal axis as freely to clear or avoid interference with other parts of the apparatus, as the recording pen 12.

As stated above, the sprocket wheel 32 is driven by friction clutches 6 and 30 through shaft 25, journalled in the upper hinge pin. This sprocket wheel 32 is effective to drive, through a suitable chain 51, a second sprocket wheel 52 attached to the lower rewind plate or disk 19b. Secured to the shaft 18 of the chart drum 14 is an adjusting knob 54 by means of which the record chart 13 may be properly calibrated upon initiating operation of the recorder, or by which a new record chart may be threaded through the chart assembly.

Associated with the lower rewind plate or disk 19a and connected to the stub shaft 19e is a pull button 55 biased against the frame 20 by spring 56. By pulling the button 55, the mandrel 15 may be removed with the roll of chart paper wrapper thereupon.

The friction clutches 30 and 6 have two functions; one is to permit operation of the drum 14 and the mandrel 15 by the manual adjusting knob 54 independently of the recorder driving motor, either properly to calibrate the chart 13 upon initiation of the operation of the recorder, or to thread a new roll of chart paper through the chart assembly. In addition, the relative diameters of the chart drum 14 and the rewind mandrel 15 change with the winding of the record chart upon the mandrel 15. The frictional clutch 30 permits a certain amount of slippage to take care of the change in the relative diameters of the two drums. The frictional constants of the clutch 6 should obviously be greater than those of the clutch 30 to permit a driving through the clutch 6, even with a slippage of the clutch 30 under the last-mentioned conditions. By mounting both friction clutches on the chart drum shaft 18, which rotates at a speed less than the stub shaft 19f, greater frictional forces are present during the transmission of the required torque than would be the case if mounted on the shaft 19f of higher speed; therefore a wider latitude in designing the clutches is secured.

Figures 3, 4:
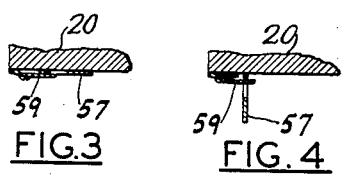
Figs. 3 and 4 are fragmentary cross-sectional views of a chart clip used with the chart assembly of Fig. 1.

It has been found desirable, also, to use a pair of clips 57 provided with slots 58 riding over the projections 17 of the chart drum 14 to improve the engagement between the chart 13 and the drum 14. The clips 57 may be mounted in spring hinges 59, shown in cross-sectional detail in Figs. 3 and 4, in closed and open positions, respectively.

Additional features of our improved record chart assembly may be seen by reference to Figs. 5, 6, 9 and 10. It will be noted that the record chart 13 is supplied from a chart feed roll 60 wound on a mandrel 60a and supported on stub shafts 61 and 61a. The threaded stub shaft 61a may be laterally adjusted by knob 62a and locked by means of a knurled lock nut 62. Shafts 61 and 61a are provided with a pair of opposed bearing plates 63, one of which is biased by a suitable spring 64 toward the mandrel 60a. A pull button 65 is effective to withdraw against the bias of spring 64 the bearing plate 63 to permit removal of the feed roll mandrel 60a when the record chart 60 thereon has become exhausted. If desired, the stub shaft 19f may be provided with an adjustable bushing 70 secured in the frame 20 by lock nuts 66 in order that the rewind mandrel 15 may be maintained in accurate alignment with the main chart drum 14.

As shown particularly in Figs. 5 and 10 the record chart, after leaving the feed roll 60, passes between the shaft 39 of the latching mechanism and the frame 20 and upwardly between an auxiliary shaft or rod 67 supported in the frame 20 and thence over the chart drum 14. The rods or shafts 67 and 39 are effective to increase the angle of engagement between the record chart and the drum 14 and, in addition, to introduce a small frictional drag to insure that the record chart is maintained taut. If desired, an idling pulley 68 may be journalled on the shaft 67 and the sprocket chain 51 passed thereover, thereby avoiding interference of the chain with other portions of the chart assembly. The chart frame 20 includes, either as an integral or separable portion, the chart plate 69 which acts as a backing or support for the chart 13 throughout substantially its whole exposed area. At its upper end the chart plate 69 is extended into a curved portion approximately tangent to the chart drum 14. The lower end of the chart plate 69 is rounded or curved and serves as a guide surface for the record chart fed to the rewind mandrel 15.

While the drive to the skew gears 26, 27 of Fig. 1 may be effected in any suitable manner, we have shown, in Fig. 9, one specific embodiment which has been utilized in our improved recorder. In this arrangement, a motor 71, supported from the frame 46 of the recorder mechanism, drives the skew gear 27 through a gear train comprising a worm 72 and worm-wheel 73, a worm 74 and worm-wheel 75, and spur gears 76, 77 and 78. It will be understood that the motor 71 is preferably a constant speed motor, such as a synchronous electric motor, or any other electric motor, air turbine or other of the types of motors well-known in the art suitable for such purposes, the speed of which may be governed or controlled in any desired manner.

The mounting of the recorder mechanism may be best understood by reference to Figs. 1 and 11. The recording mechanism is supported from the frame 46 provided with integral or separable hinge elements 79 and 80 receiving the hinge pin or sleeve 25 and pin 33, respectively. Thus, the recorder mechanism and the record chart assembly are relatively movable about a common pivotal axis. In order to secure the recorder mechanism frame in accurate registration with other elements and within its enclosing housing H, the frame 46 is provided with an integral or separable projection 81 having a depending arm 82. Cooperating with the projection 81 is a bracket 83 (Figs. 1, 7, 8 and 8a) rigidly supported from the enclosing casing of the recorder. The bracket 83 has a horizontally extending arm on which is supported an adjustable stop 84. The bracket 83 includes also an upstanding arm 85 from which extends an arm 86. A horizontally extending stop 87 is supported in the arm 86. The upstanding arm 85 carries a suitable latching spring 88 cooperating with an upstanding latching surface 89 of the projecting arm 81 of the recorder mechanism frame, as shown most clearly in Figs. 7 and 8a.

Figure 8A:
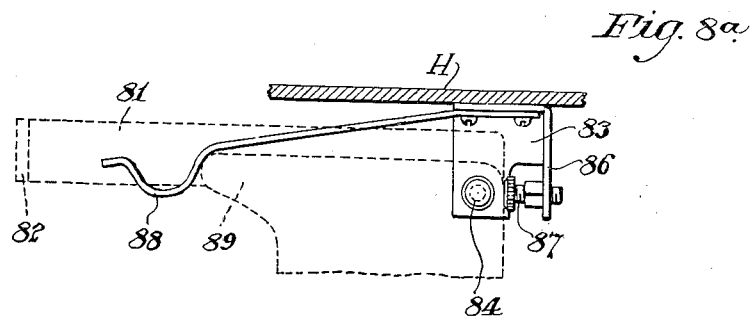
Fig. 8a is a plan view of the stop device shown in Figs. 7 and 8.

As the recorder mechanism frame 46 is moved about its pivotal axis from the position shown in Fig. 11 to that shown in Fig. 1, the lower surface of the projection 81 engages the stop surface 84, as shown in Fig. 7, and accurately determines the vertical positioning of the recorder mechanism frame. Also, the horizontally extending stop member 87 limits the angular motion of the frame 46 about its pivot (Fig. 7) and the latching spring 88, engaging the surface 89, retains the frame 46 in this predetermined position (Fig. 8a). By this means, an accurate registration of the recorder mechanism frame 46 with other portions of the recorder included within the housing is readily obtained.

It will be apparent also that the recorder mechanism frame 46 and the chart frame 20, when in proper registration, may be swung as a unitary structure about their common pivots 25 and 33 for the purpose of inspecting the mechanism without interrupting operation of the recorder. Also, when the frame 20 is swung bodily outward until it occupies the position shown in Fig. 9, the chart assembly may be lifted bodily from the casing by simply removing the pin 36 engaging the hinge element 22. Thereupon, the apparatus may be lifted as a unitary structure, the hinge element 21 sliding over the sleeve 25 and the worm 28 and the support 37 and hinge element 22 sliding over the hinge pin 33. This feature may be advantageous when it is desired to record quantities having large differences in their maximum values, as it facilitates the rapid interchange of chart mechanisms in accordance with the particular value of the quantity obtaining at a given time.

While any suitable type of recorder mechanism may be utilized in connection with our invention, there are shown in Fig. 11 the essential features of one recorder mechanism which is particularly suitable for use in connection therewith, and which is shown and described in U. S. Letters Patent No. 1,935,732 granted November 21, 1933 upon the application of Lloyd Y. Squibb, to which reference is made for a detailed description thereof. In general, this recorder mechanism includes an indicating device, such as a galvanometer 90, provided with a deflecting needle 91 and connected to be responsive to the condition which it is desired to record. The mechanism includes also a slidewire 92, together with cooperating stationary contact 93, the position of the slidewire 92 being intermittently adjusted, in accordance with the deflection of the needle 91, by means of a clutch disk 94 and suitable cam mechanism driven by a continuously rotating shaft 95. The shaft 95 is driven by motor 71 through gearing 72, 73, which forms a portion of the gearing of the drive for the record chart, as shown in Fig. 9. The recorder pen 12 is driven laterally of the indicating scale 10 and the record chart 13 (Fig. 1) in accordance with variations in the setting of the slidewire 92 which, in turn, affords a measurement of the variations in the condition to be recorded.

As shown in Fig. 12, the recorder pen is guided by bar 96 for movement by the cord 97 which is secured to the pen carriage and passes over the idler pulleys 98 pivotally secured to frame 46 and over the pulley 99 secured to the shaft of slidewire 92.

In Fig. 12, the bracket 83 and associated parts are omitted for clarity.

While we have described what we at present consider the preferred embodiment of our invention, it will be obvious to those skilled in the art that various changes and modifications may be made without departing from our invention, and we therefore aim in the appended claims to cover all such changes and modifications as fall within the true spirit and scope of our invention.

What we claim is:

1. Recording apparatus comprising a housing, a marker, a unit comprising an actuating mechanism disposed in said housing and pivoted with respect thereto, a driving connection between said mechanism and said marker, and a second unit comprising a chart and driving mechanism therefor, pivoted within said housing for movement relative to said first-named unit.

2. A recorder comprising a casing, a recording pen, actuating mechanism therefor, a supporting frame for said mechanism pivotally mounted in said casing, a record chart, a supporting frame for said chart independently pivotally mounted in said casing, one of said frames being relatively movable in an arcuate path with respect to the other and the pivotal mounting of said frames enabling them to be swung outwardly from the casing, and means for moving one of said frames in a path other than said arcuate path to avoid interference between said chart and said pen.

3. A recorder comprising a casing, a recording pen, actuating mechanism therefor, a supporting frame for said mechanism, a record chart, and a supporting frame for said chart, said frames being pivotally supported in said casing about a common axis and one frame being relatively movable with respect to the other to effect the engagement and disengagement of said chart and said pen, the pivotal mounting of said frames enabling them to be swung outwardly from said casing.

4. A recorder comprising a casing, a recording pen, actuating mechanism therefor, a supporting frame for said mechanism, a record chart, a supporting frame for said chart, a common hinge element interconnecting said frames and said casing, a motor for operating said actuating mechanism mounted on its associated frame, and a driving connection between said motor and said chart maintained during relative pivotal movement of said frames.

5. A recorder comprising a casing, a recording pen, actuating mechanism therefor, a supporting frame for said mechanism, a record chart, a driving reel for said chart, a supporting frame for said reel, a common hinge element interconnecting said frames and said casing and providing for movement of one frame with respect to the other to effect the engagement and disengagement of said chart and said pen, a motor for operating said recorder mechanism mounted on its associated frame, and a driving connection between said motor and said chart reel including a worm coaxial with the pivot of said hinge and a cooperating worm wheel carried by said reel-frame.

6. In a recorder, a marker, a supporting frame, an auxiliary frame pivotally supported with respect to said first frame about a vertical axis and movable up and down along said axis, a record chart mounted in said auxiliary frame and movable therewith into and out of the plane of said marker, and stop mechanism for limiting pivotal motion of said auxiliary frame about its pivot when raised along its pivotal axis to a position in which said marker obstructs pivotal movement of said chart.

7. In a recorder, a recording pen, a supporting frame, an auxiliary frame pivotally supported with respect to said first frame and movable along its pivotal axis, a record chart mounted in said auxiliary frame and movable therewith into and out of engagement with said pen, stop mechanism for limiting pivotal motion of said auxiliary frame about its pivot when in such position along its pivotal axis that said recording pen obstructs pivotal movement of said chart, and a cam mechanism for moving said auxiliary frame along its pivotal axis to effect engagement and disengagement between said recording pen and said chart.

8. In a recorder, a marker, actuating mechanism therefor, a supporting frame for said actuating mechanism, a record chart, a supporting frame for said record chart, said frames being pivotally interconnected and one frame relatively movable with respect to the other to effect the engagement and disengagement of said chart and said marker, a motor movably mounted relative to said chart supporting frame, and a driving connection between said motor and said chart maintained during the relative movement therebetween.

9. In a recorder, a marker, actuating mechanism therefor, a supporting frame for said actuating mechanism, a record chart, a supporting frame for said record chart, said frames being pivotally interconnected and one movable relatively to the other to effect the engagement and disengagement of said chart and said marker, a motor movably mounted relative to said chart supporting frame, and a driving connection between said motor and said chart including a driving element coaxial with the pivotal connection between said frames.

10. In a recorder, a marker, actuating mechanism therefor, a supporting frame for said mechanism, a record chart, a supporting frame for said record chart, said frames being pivotally interconnected and one frame relatively movable with respect to the other to effect the engagement and disengagement of said chart and said marker, an electric motor mounted in said first-named supporting frame, and a geared driving connection between said motor and said chart, one of the elements of said connection being coaxial with said pivotal connection and one being carried by said chart-frame.

11. In a recorder, a supporting frame for a recorder pen, a record chart, a supporting frame for said record chart, said frames being pivotally interconnected and one frame relatively movable with respect to the other to effect the engagement and disengagement of said chart and said pen, an electric motor mounted on said first-named supporting frame, and a driving connection between said motor and said chart including a worm coaxial with said pivotal connection, and a cooperating worm wheel carried by said chart-frame.

12. In a recorder, a marker, actuating mechanism therefor, a supporting frame for said actuating mechanism, a record chart, a supporting frame for said record chart, a hinge pin interconnecting said frames, one of said frames being relatively movable with respect to the other to effect the engagement and disengagement of said chart and said marker, a motor mounted on said first-named frame, and a driving connection between said motor and said chart including two gears forming a unitary structure with said hinge pin, a cooperating gear driven by said motor, and a second cooperating gear driving said chart.

13. In a recorder, a marker, actuating mechanism therefor, a supporting frame for said actuating mechanism, a record chart, a supporting frame for said record chart, hinge means interconnecting said frames and including a hinge pin, one of said frames in addition to its pivotal movement being relatively movable with respect to the other to effect the engagement and disengagement of said chart and said marker, a motor mounted on said first-named frame, and a driving connection between said motor and said chart including a worm and a worm wheel, said worm and said hinge pin comprising a unitary structure, said driving connection including additional gears, one forming a unitary structure with said hinge pin and one connected to be driven by said motor.

14. In a recorder, a marker, actuating mechanism therefor, a supporting frame for said actuating mechanism, a record chart, a supporting frame for said chart, said frames being pivotally interconnected and one movable along its pivotal axis relative to the other to move said pen and said chart into and out of cooperative relationship, stop means for aligning said frames in proper angular and axial relation, and means for latching said frames together in aligned relation to maintain normal registration between said pen and said chart.

15. In combination, a pair of frames, exhibiting structure having a scale mounted on one of said frames and an element normally depending from the other of said frames below the upper edge of the scale and movable across the scale, means pivotally interconnecting said frames and providing for movement of one frame with respect to the other along the pivotal axis, and means for locking said frames together when said frames are in positions such that said element obstructs pivotal movement of said scale, said last-named means automatically releasing said frames for pivotal movement when said frames occupy positions such that said element is free of said upper edge of said scale.

16. A recorder comprising a casing, a recording pen and actuating mechanism therefor, a supporting frame for said mechanism pivotally mounted on said casing, a record chart, a supporting frame for said chart independently pivotally mounted on said casing, one of said frames being relatively movable about a pivotal axis with respect to the other of said frames, and means for moving one of said frames parallel to said pivotal axis to move the pen out of cooperative relationship with the chart prior to said relative pivotal movement of said frames.

17. Recording apparatus comprising a support, a marker, actuating mechanism for said marker, a supporting frame for said mechanism pivotally mounted with respect to said support, a record chart, a frame pivotally mounted with respect to said support for supporting said chart in cooperative relation with said marker, one of said frames being pivotally movable with respect to the other of said frames, and means for imparting movement to one of said frames in addition to its pivotal movement to facilitate relative movement of said marker and chart out of cooperative relationship.

18. In a recorder, a marker, a marker-actuating mechanism, a supporting frame for said marker and its mechanism, a markable element, a supporting frame for said element, means pivotally interconnecting said frames and providing for movement of one frame along its pivotal axis to move into and out of cooperative relationship said marker and said element, and interlocking mechanism for insuring in sequence pivotal and axial movements of said one frame.

19. In a recorder, a marker, a marker-actuating mechanism, a supporting frame for said marker and its mechanism, a markable element, a supporting frame for said element, means pivotally interconnecting said frames and providing for movement of one frame along its pivotal axis to move into and out of cooperative relationship said marker and said element, and a removable locking pin for normally limiting the axial movement of said one frame and effective upon removal to release said one frame for axial movement into disengaging relationship with said other frame and said pivot means.

20. In a recorder, a marker, actuating mechanism therefor, a supporting frame for said mechanism, a record chart, a supporting frame for said chart, hinge-elements respectively secured to, and pivotally interconnecting said frames, one of said frames being relatively movable about a pivotal axis with respect to the other of said frames, means for moving one of said frames parallel to said pivotal axis to move into and out of cooperative relationship said marker and said chart, one of said hinge elements having a slot presented to its associated hinge-element, and said associated hinge-element having a key movable into and out of said slot as said marker is moved into and out of cooperative relation with said chart to prevent pivotal movement of said frames when said key is within said slot.

21. Recording apparatus comprising a support, a marker, an actuating mechanism for said marker, a supporting frame for said mechanism, a markable element, driving mechanism therefor, a supporting frame for said element and said driving mechanism, pivotal connections between said frames and said support, one connection comprising a hollow sleeve secured to said support, said element-frame being movable axially of its pivotal axis, cam mechanism for axially moving said element-frame to bring said markable element into and out of cooperative relation with said marker, cooperating interlocking means supported respectively by said frames for interlocking said frames when said marker and element are in said cooperative relation, an operating member for said cam mechanism supported on the side of said element-frame remote from said pivotal connections, a latching member secured to said support, said operating member having a portion movable into latching engagement with said latching member as said markable element is moved into cooperative relation with said marker, a shaft journaled within said sleeve, and gears secured at opposite ends thereof to form a driving connection maintained at all times between said element-driving mechanism and said marker-actuating mechanism.

RAYMOND W. ROSS.
SIGURD H. SEBERHAGEN.

CERTIFICATE OF CORRECTION.

Patent No. 2,074,118. March 16, 1937.

RAYMOND W. ROSS, ET AL.

It is hereby certified that error appears in the printed specification of the above numbered patent requiring correction as follows: Page 2, second column, line 5, strike out the comma at beginning of line and indent the word "In" as a new paragraph; line 36, before the word "assembly" insert chart; line 75, after "apparatus" strike out the period and insert instead a comma; page 4, second column, line 55, claim 6, after "frame" insert for movement; and that the said Letters Patent should be read with these corrections therein that the same may conform to the record of the case in the Patent Office.

Signed and sealed this 24th day of August, A. D. 1937.

Leslie Frazer (Seal)

Acting Commissioner of Patents.